US010239619B2

(12) United States Patent
Moran (10) Patent No.: US 10,239,619 B2
(45) Date of Patent: *Mar. 26, 2019

(54) GALLEY COMPARTMENT FOR A GALLEY SYSTEM OF AN AIRCRAFT (71) Applicant: THE BOEING COMPANY, Chicago, IL (US)

(72) Inventor: Thomas Joseph Moran, Lake Stevens, WA (US)

(73) Assignee: The Boeing Company, Chicago, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 15/784,241

(22) Filed: Oct. 16, 2017

(65) Prior Publication Data
US 2018/0037323 A1 Feb. 8, 2018

Related U.S. Application Data (63) Continuation of application No. 14/525,723, filed on Oct. 28, 2014, now Pat. No. 9,802,703.

(51) Int. Cl.
B64D 11/04 (2006.01)
B64D 11/00 (2006.01)
B64D 13/08 (2006.01)
B64D 13/06 (2006.01)

(52) U.S. Cl.
CPC .......... B64D 11/04 (2013.01); B64D 11/0007 (2013.01); B64D 13/08 (2013.01); B64D 2013/0629 (2013.01)

(58) Field of Classification Search
CPC .... B64D 11/04; B64D 11/0007; B64D 13/08; F25D 19/00; F25D 19/003; F25D 19/006; Y10S 165/918; Y10S 165/919
See application file for complete search history.

(56) References Cited

U.S. PATENT DOCUMENTS

| 3,897,989 | A | * | 8/1975 | Grandi | A47F 3/04 312/236 |
| 4,087,142 | A | * | 5/1978 | Aumack | A47J 39/006 165/61 |
| 4,254,824 | A | * | 3/1981 | Springer | F25D 31/005 165/64 |
| 4,285,391 | A | * | 8/1981 | Bourner | F25D 31/005 165/61 |
| 4,361,014 | A | * | 11/1982 | Blain | A47J 39/006 62/237 |
| 4,888,958 | A | * | 12/1989 | Ella | A61F 7/00 285/179 |

(Continued)

Primary Examiner — Michael H Wang
(74) Attorney, Agent, or Firm — Jay J. Hoette; The Small Patent Law Group, LLC (57) ABSTRACT A galley system includes a galley compartment defining a cavity. The galley compartment has a door that allows access to the cavity. A galley cart is positionable in the cavity of the galley compartment that has a first opening and a second opening. An air supply and return system is coupled in flow communication with the first opening of the galley cart and the second opening of the galley compartment. A space is defined about the galley cart when the galley cart is positioned in the cavity. The space provides flow communication between the second opening of the galley cart and the second opening of the galley compartment.

29 Claims, 5 Drawing Sheets

(56) References Cited

U.S. PATENT DOCUMENTS

| | | | | |
|---|---|---|---|---|
| 4,969,509 A * | 11/1990 | Merensky | | B64D 13/08 165/104.34 |
| 5,491,979 A * | 2/1996 | Kull | | B64D 11/0007 165/104.28 |
| 5,513,500 A * | 5/1996 | Fischer | | B64D 11/0007 62/239 |
| 6,684,657 B1 * | 2/2004 | Dougherty | | A47J 39/003 165/918 |
| 6,845,627 B1 * | 1/2005 | Buck | | B64D 11/04 165/919 |
| 7,198,228 B2 * | 4/2007 | Mills | | B64D 11/00 244/118.5 |
| 7,231,778 B2 * | 6/2007 | Rigney | | B60H 1/00014 62/407 |
| 9,045,229 B2 * | 6/2015 | Roering | | B64D 11/0007 |
| 9,555,892 B2 * | 1/2017 | Dessero | | B64D 13/08 |
| 2005/0210910 A1 * | 9/2005 | Rigney | | B60H 1/00014 62/407 |
| 2009/0145154 A1 * | 6/2009 | Konrad | | F25D 15/00 62/298 |
| 2010/0224726 A1 * | 9/2010 | Lu | | F25D 17/06 244/118.5 |
| 2012/0025679 A1 * | 2/2012 | Roering | | B64D 11/0007 312/236 |
| 2013/0047657 A1 * | 2/2013 | Oswald | | B64D 11/04 62/407 |
| 2013/0206905 A1 * | 8/2013 | Savian | | B64D 11/003 244/118.5 |
| 2013/0292102 A1 * | 11/2013 | Trumper | | B64D 13/08 165/168 |
| 2013/0344789 A1 * | 12/2013 | Lee | | B64D 13/08 454/76 |
| 2014/0008492 A1 * | 1/2014 | Ehlers | | B64D 11/00 244/118.5 |
| 2015/0007600 A1 * | 1/2015 | Godecker | | B64D 11/04 62/238.6 |
| 2015/0028157 A1 * | 1/2015 | Hoogeveen | | B64D 11/0007 244/118.1 |
| 2015/0059384 A1 * | 3/2015 | Burd | | B60H 1/00014 62/239 |
| 2015/0059385 A1 * | 3/2015 | Burd | | B60H 1/00014 62/239 |
| 2015/0065024 A1 * | 3/2015 | Moran | | B64D 11/0007 454/74 |
| 2015/0099446 A1 * | 4/2015 | Burd | | B64D 13/08 454/152 |

* cited by examiner

GALLEY COMPARTMENT FOR A GALLEY SYSTEM OF AN AIRCRAFT

CROSS REFERENCE TO RELATED APPLICATIONS

This application is a continuation of and claims priority to U.S. patent application Ser. No. 14/525,723 filed Oct. 28, 2014 (now U.S. Pat. No. 9,802,703 issued Oct. 31, 2017), the subject matter of which is herein incorporated by reference in its entirety.

BACKGROUND

The present disclosure relates generally to systems and methods of arranging airflow supply and return components in a galley monument.

Aircraft typically include multiple galley monuments to store food and beverages on the aircraft. The food and beverages are typically stored in galley carts which are transported to the aircraft and stored in refrigerated compartments or zones in the galley monuments. A heat exchanger supplies cooled air to each of the compartments or zones via a plurality of air ducts and other components. The air ducts and the supply and return devices associated with the air ducts are routed along the back wall of the galley compartments to supply the cooled air to the galley compartments and to return the air to the heat exchanger. For example, vertical ducts may extend from the heat exchanger, located above the galley monument, down the back wall of the galley monument to the level of galley compartments, which are located at the bottom of the galley monument. Horizontal ducts may extend from the corresponding vertical ducts along the various galley compartments to supply the air to, or return the air from, the galley compartments.

In some applications, the galley carts are cooled by an air-through-cart cooling arrangement where the air is supplied directly into the galley carts from the supply ducts, such as using air supply valves that interface directly to the carts. Similarly, air return valves are connected to other locations of the galley carts to remove air from the galley carts. In other applications, the galley carts are cooled by an air-over-cart cooling arrangement where air is supplied to the galley compartments and is allowed to pass over the galley carts, such as along the outside of the galley carts, to cool the galley carts. In such applications, air grills are provided in the galley compartment space to vent the air. Such valves and air grills are typically arranged behind the galley carts wither in the back wall or extending into the galley compartments from the back wall.

A large amount of space is required for the airflow supply and return components, such as the ducts, supply valves, return valves, supply grills, return grills, and the like. The footprint of the galley monument is wide enough to accommodate the galley carts as well as the airflow supply and return components. The galley monuments occupy valuable space within the cabin of the aircraft, which limits the number of passenger seats that may be provided on the aircraft. For example, the airflow supply and return components may add approximately 4-5 inches of width to the galley monuments, and some aircraft may have eight or more galley monuments, leading to a large amount of cabin space dedicated to the airflow supply and return components, which may be used for other purposes.

SUMMARY

In accordance with one embodiment, a galley system is provided that includes a galley compartment defining a cavity. The galley compartment has a door that allows access to the cavity and at least a first opening and a second opening. A galley cart is positionable in the cavity of the galley compartment that has a first opening and a second opening. An air supply duct is configured to be coupled in flow communication with the first opening of the galley cart and the first opening of the galley compartment. A space is defined about the galley cart when the galley cart is positioned in the cavity. The space provides flow communication between the second opening of the galley cart and the second opening of the galley compartment.

In accordance with one embodiment, a galley monument is provided for use with a galley cart having a first opening and a second opening. The galley monument includes a galley compartment having a back wall, a top wall, a bottom wall, and a front wall. The front wall has a doorway defined therethrough that is configured to allow the galley cart to be positioned in the galley compartment. A door is coupled to the front wall to close the doorway. The back wall, the top wall, the bottom wall and the door define a cavity configured to receive the galley cart. An air supply duct is configured to be coupled in flow communication with the first opening of the galley cart. An air return duct is configured to be coupled in flow communication with the second opening of the galley cart. At least one of the air supply duct or the air return duct is defined in one of the top wall or the bottom wall and not in the back wall of the galley compartment.

The features and functions that have been discussed can be achieved independently in various embodiments or may be combined in yet other embodiments, further details of which can be seen with reference to the following description and drawings.

DETAILED DESCRIPTION

The following detailed description of certain embodiments will be better understood when read in conjunction with the appended drawings. It should be understood that the various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

Described herein are various embodiments of a galley system for an aircraft configured to supply cooling air to a compartment of a galley monument for cooling galley carts. Various embodiments provide a network of cooling ducts of the galley system that are arranged to reduce a size or footprint of the galley monument, which may provide additional space in the passenger compartment, such as for adding additional room for passenger seating. Various embodiments provide an efficient cooling environment for the galley carts using air-through-cart cooling arrangements and/or air-over-cart cooling arrangements.

Figure 1:
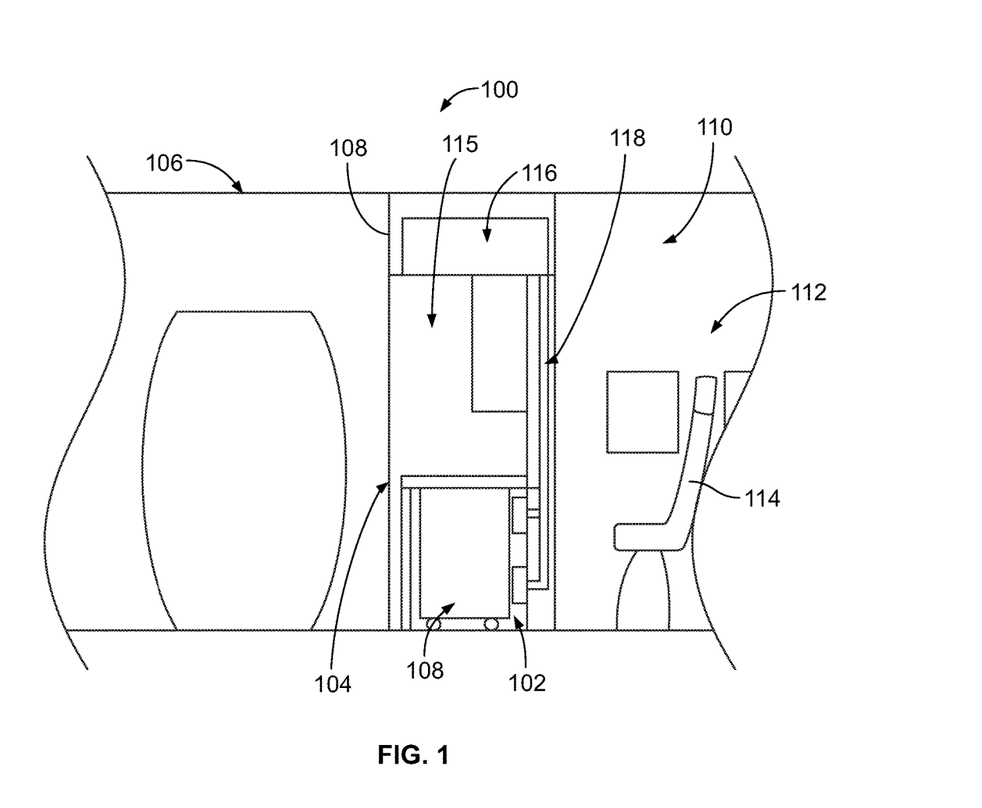
FIG. 1 is a schematic illustration of an exemplary galley system for an aircraft.

FIG. 1 is a schematic illustration of an exemplary galley system 100 for an aircraft 106. The galley system 100 is used to cool galley carts 108 held in galley compartments 102 of a galley monument 104. The galley monument 104 defines one or more galley compartments 102, which are typically arranged below a counter of the galley monument 104. The galley monument 104 is positioned within a cabin 110 of the aircraft 106, and the cabin of the aircraft 106 is divided into a passenger area 112, where passenger seats 114 are located, and a galley area 115, where the galley monument 104 is located. The passenger area 112 is the area exterior of the galley monument 104 within the aircraft 106 where passengers are able to be located. Space dedicated to the galley monument 104 is unusable for passenger seats 114 or other purposes such as lavatories, and thus it may be desirable for aircraft manufacturers to reduce the footprint of the galley area 115 in order to increase the passenger area 112 to increase revenue of each flight for aircraft operators.

The galley monument 104 may include any number of galley compartments 102 and the aircraft 106 may include any number of galley monuments 104. The galley monuments 104 are typically arranged near the doors of the aircraft 106, such as at the fore and/or aft of the cabin 110, but may be located mid-cabin in some embodiments. The galley monuments 104 may be used for the storage and/or preparation of food or beverages. Some galley monuments may be bar units used strictly for preparation of beverages. Some galley monuments may be incorporated into other monuments used for other purposes such as closets, workstations, lavatories, and the like. Some galley monuments may be provided overhead or under floor in some embodiments, as opposed to being situated in the passenger cabin. As used herein a galley compartment is an insulated volume that is utilized to store one or more galley carts on the aircraft 106. A galley cart, as used herein, is a portable device that is used to store food and/or beverages that are transported from a caterer to the aircraft 106 or from the galley compartments 102 to other parts of the aircraft 106 for serving the food and/or beverages. The galley carts may include wheels, however some galley carts may be hand carried boxes in some embodiments.

The galley system 100 includes a heat exchanger 116 that provides cooled air. The heat exchanger 116 may be positioned above the galley monument 104 (e.g., in the crown of the aircraft 106), as in the illustrated embodiment, may be positioned in the galley monument 104, or may be positioned below the galley monument 104 (e.g., in the belly of the aircraft 106). The galley system 100 includes an airflow supply and return system 118, in flow communication with the heat exchanger 116 and the galley compartments 102, to channel the air supply from the heat exchanger 116 to the galley compartments 102 and back to the heat exchanger 116.

Figure 2:
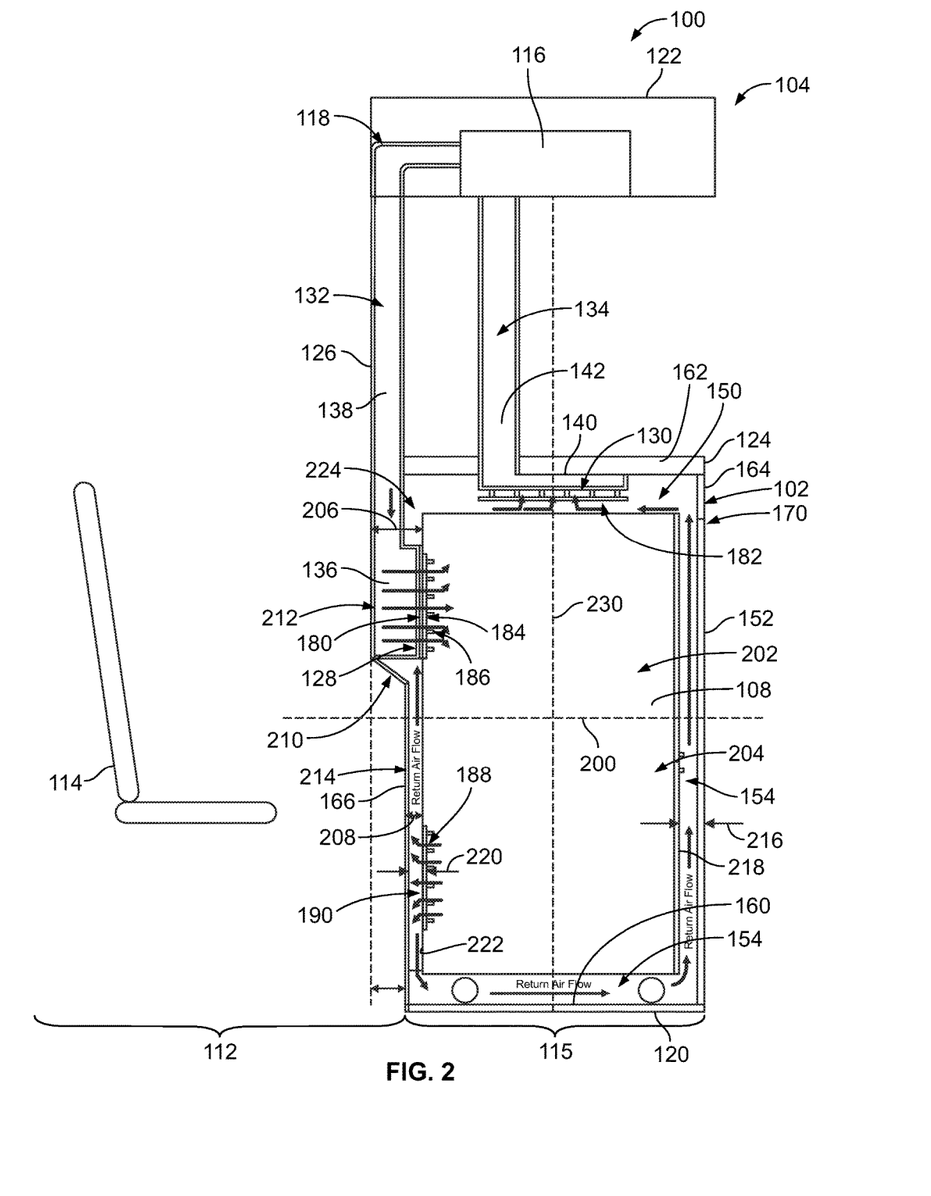
FIG. 2 is a cross-sectional view of a galley monument and galley system in accordance with an exemplary embodiment.

FIG. 2 is a cross-sectional view of the galley monument 104 and galley system 100 in accordance with an exemplary embodiment. The galley monument 104 includes a bottom 120, a top 122, a front 124 and a back 126 opposite the front 124, and may include at least one side (not shown). The galley monument 104 includes a first opening 128 into the galley compartment 102 and a second opening 130 into the galley compartment 102. Air can flow into and out of the galley compartment 102 through the first and second openings 128, 130, respectively. For example, the airflow supply and return system 118 may be in flow communication with the first and second openings 128, 130. The back 126 may be forward facing or rearward facing, depending on the orientation of the galley monument 104 within the cabin 110. The back 126 may face the passenger area 112 (e.g., passenger seats 114 may be located behind the back 126, in front of the back 126, and the like); however in alternative embodiments, the back 126 may be positioned against a bulkhead.

In an exemplary embodiment, the heat exchanger 116 is positioned at the top 122. The heat exchanger 116 includes a fan used to increase the flow of air through the galley system 100. The fan forces the airflow through the airflow supply and return system 118 and directs the air over a galley chilling unit used to reduce the temperature of the airflow. The fan may be positioned in the airflow supply and return system 118, such as between a return duct and a supply duct. The fan may be positioned upstream of the galley chilling unit; however, the fan may be positioned at other locations in alternative embodiments. In one embodiment, the galley chilling unit is a liquid-cooled galley chilling unit that provides chilled liquid, such as a refrigerant, to the heat exchanger 116 to cool the air supply. Heat exchanging of the liquid may be performed remote from the heat exchanger 116 and from the galley monument 104, such as in the belly of the aircraft 106. In another embodiment, the galley chilling unit is a conventional refrigeration unit, which includes an evaporator, a condenser, a compressor, and an expansion valve (not shown).

The airflow supply and return system 118 is arranged within the galley monument 104. Components of the airflow supply and return system 118 may be routed in various locations to supply and return the air as needed. In the illustrated embodiment, components of the airflow supply and return system 118 are generally arranged along the back 126 of the galley monument 104, such as behind the cabinets, galley compartments 102, and other compartments of the galley monument 104. In an exemplary embodiment, the components of the airflow supply and return system 118 are routed in areas to reduce a depth of at least a portion of the galley monument 104. For example, one or more ducts of the airflow supply and return system 118 are routed to locations other than behind the galley compartment 102 to reduce the depth of the galley compartment 102, which may decrease the footprint of the galley area 115, and thus increase the footprint of the passenger area 112.

The airflow supply and return system 118 includes at least one cooling air supply duct 132 to supply cooled air to the galley compartment(s) 102 and at least one air return duct 134 to return air to the heat exchanger 116. The ducts 132, 134 may be embedded in the walls or structures defining the galley monument 104 and/or the cabinets, compartments, and the like of the galley monument 104. The ducts 132, 134 may be defined by separate structures, such as sheet metal ducts preformed and set in the walls. Alternatively, the ducts 132, 134 may be defined by the walls themselves, such as by bores or channels in the walls. The walls may define portions or sides of the ducts 132, 134.

Optionally, the air supply duct 132 may include a horizontal supply duct 136 and a vertical supply duct 138. The vertical supply duct 138 extends between the horizontal supply duct 136 and the heat exchanger 116. The horizontal supply duct 136 may extend into each of the galley compartments 102 to supply cooled air to each of the galley compartments 102. The horizontal supply duct 136 may define a manifold for supplying cooled air to multiple galley compartments 102. In the illustrated embodiment, the horizontal supply duct 136 is positioned at the back 126, such as behind the galley compartment(s) 102. The horizontal supply duct 136 may be positioned at other locations in alternative embodiments, such as along the top of the galley compartments 102 (e.g., directly under the counter above the galley carts 108), along the bottom 120 (e.g., along the floor below the galley carts 108), and the like. Other arrangements of supply and return ducts are possible in alternative embodiments.

Optionally, the air return duct 134 may include a horizontal return duct 140 and a vertical return duct 142. The vertical return duct 142 extends between the horizontal return duct 140 and the heat exchanger 116. The horizontal return duct 140 may extend into each of the galley compartments 102 to return air from each of the galley compartments 102. In the illustrated embodiment, the horizontal return duct 140 is positioned at the top of the galley compartment 102, such as above the galley cart 108. The horizontal return duct 140 may be positioned at other locations in alternative embodiments, such as along the bottom of the galley compartments 102, along the back 126, and the like. Other arrangements of supply and return ducts are possible in alternative embodiments.

The galley compartment 102 is positioned near the bottom 120, such as below the counter area, for loading and unloading of the galley carts 108 into a cavity 150 defined by the galley compartment 102. Cabinets or other non-cooled compartments may be provided above the galley compartment 108, such as above the counter area of the galley monument 104. In some alternative embodiments, cooled compartments may be provided above the counter area and the airflow supply and return arrangements described herein may be useful for such cooled compartments, such as to provide more counter top space or larger (e.g., deeper) containers that may be placed in such cooled compartments. The galley compartment 102 has one or more doors 152 at the front 124 that may be opened to provide access to the cavity 150 of the galley compartment 102, such as to load and unload the galley cart 108 through the front 124. The door(s) 152 may be closed to retain the galley cart 108 in the galley compartment 102 and/or to enclose the cooling space in the cavity 150 and/or to provide thermal insulation. In an exemplary embodiment, when the galley cart 108 is positioned in the cavity 150, a space 154 is defined about the galley cart 108. Optionally, air may be able to flow around the galley cart 108 in the space 154.

The galley compartment 102 includes a plurality of walls defining the cavity 150. The first and second openings 128, 130 may extend at least partially through the walls. In an exemplary embodiment, the galley compartment 102 includes a bottom wall 160, a top wall 162, a front wall 164, a back wall 166 and side walls 168. The side walls 168 may separate adjacent galley compartments 102. In alternative embodiments, the galley monument 104 may only include side walls 168 along the exterior sides of the galley monument 104 and may be devoid of internal side walls separating the galley compartments 102. In such embodiments, each of the galley compartments 102 may be open to each other. The front wall 164 includes a doorway 170 defined therethrough. The doorway 170 allows the galley cart 108 to be loaded into, and unloaded from, the galley compartment 102. The door 152 is coupled to the front wall 164 to close the doorway 170. The top wall 162 may be defined by a counter of the galley monument 104. The bottom wall 160 may be defined by a floor of the cabin 110.

The back wall 166 may define the back 126 of the galley monument 104. The back wall 166 may be exposed to the exterior environment of the galley monument 104. For example, the back wall 166 may be exposed to the passenger area 112 of the cabin 110. The back wall 166 is provided opposite the front wall 164 and the door 152. In an exemplary embodiment, at least a portion of the back wall 166 is shifted forward, as compared to galley monuments that provide airflow supply or return components along the back wall 166, to reduce the footprint of the galley monument 104. At least a portion of the back wall 166 is shifted toward the galley cart 108 to reduce the volume of the cavity 150 of the galley compartment 102. Such reduction in volume of the galley compartment 102 equates to an increase in volume of the passenger area 112. For example, more space may be provided for passenger seats 114. For example, more leg room may be provided for passengers in the passenger seats 114. To create additional room in the galley compartment 102, for shifting the back wall 166 toward the galley cart 108, at least some of the components of the airflow supply and return system 118 may be moved away from the back wall 166, such as to the top wall 162 and/or the bottom wall 160. For example, portions or all of the back wall 166 may be devoid of air ducts or other components of the airflow supply and return system 118.

In an exemplary embodiment, the airflow supply and return system 118 includes an air supply device 180 and an air return device 182. The air supply device 180 is provided at the first opening 128. The air return device 182 is provided at the second opening 130. The air supply device 180 is in flow communication with the air supply duct 132. The air return device 182 is in flow communication with the air return duct 134.

In various embodiments, the airflow devices 180 and/or 182 may be cart valves configured to engage and/or mate with the galley cart 108. For example, the airflow device may seal to a vent of the galley cart 108 to provide a flow of air through the vent of the galley cart 108. In the illustrated embodiment, the air supply device 180 is a cart valve configured to seal against a cart supply vent 184 of the galley cart 108. The cart supply vent 184 is provided at a first opening 186 in the galley cart 108. The cart supply vent 184 may include a complementary supply valve for interfacing with the air supply device 180. Cooling airflow is configured to be supplied to the galley cart 108 through the first opening 186.

In other embodiments, the airflow device 180 and/or 182 may be an air grill through which air is able to flow. The air grill does not necessarily engage the galley cart 108 but rather may be position within the space 154 to direct air into, or receive air from, the space 154. In the illustrated embodiment, the air return device 182 is a return air grill positioned within the space 154, such as at the second opening 130. The galley cart 108 includes a second opening 188 through which return air is able to flow out of the galley cart 108 into the space 154. In an exemplary embodiment, the galley cart 108 includes a cart return vent 190 at the second opening 188.

In other embodiments, the air supply device 180 may be an air grill through which air is able to flow. Such air may be supplied to the space 154 and then enter the galley cart 108 through the cart supply vent. In other various embodiments, the air return device 182 may be a cart valve configured to seal against the cart return vent 190. Other arrangements are possible in alternative embodiments, such as, but not limited to, embodiments where both the airflow devices 180, 182 are air grills or both airflow devices 180, 182 are cart valves.

The airflow supply and return system 118 is in flow communication with the galley cart 108. For example, the air supply duct 132 is in flow communication with the first opening 128 of the galley compartment 102, such as at the air supply device 180, and is in flow communication with the first opening 186 of the galley cart 108, such as at the cart supply vent 184. The air return duct 134 is in flow communication with the second opening 130 of the galley compartment 102, such as at the air return device 182, and is in flow communication with the second opening 188 of the galley cart 108, such as through the cart return vent 190 and the space 154 about the galley cart 108. During use, flow of air through the supply and return system 118 flows through the air supply duct 132, through the air supply device 180 and into the galley cart 108. The air passes over the food or beverages in the galley cart 108, such as by an air-through-cart supply arrangement. The air from the galley cart 108 then flows through the cart return vent 190 into the space 154. The door 152 closes the cavity 150 to define the space 154 and contain the air in the space 154. The air is able to flow around the outside of the galley cart 108 within the space 154 in an air-over-cart supply arrangement to the air return device 182. The air flows through the return device 182 to the air return duct 134. By channeling around the galley cart 108 within the space 154, the galley system 100 has the benefits of both an air-through-cart supply arrangement and an air-over-cart supply arrangement, which may increase the cooling efficiency of the galley system 100.

The galley compartment 102 may be vertically divided in half at a center line 200 with a top half 202 of the galley compartment 102 positioned above the center line 200 and a bottom half 204 of the galley compartment 102 positioned below the center line 200. The air supply duct 132 is routed along the back wall 166 within the top half 202. The air supply duct 132 may define a portion of the back wall 166. The air supply duct 132 may be an internal air supply duct running along the back wall 166 and positioned within the back wall 166. The air supply duct 132 may run along the interior surface of the back wall 166 within the cavity 150. In the illustrated embodiment, the back wall 166 along the top half 202 is positioned a first distance 206 from a rear of the galley cart 108, whereas the back wall 166 along the bottom half 204 is positioned a second distance 208 from the rear of the galley cart 108. The first distance 206 is different than the second distance 208. In the illustrated embodiment, the first distance 206 is greater than the second distance 208. In other words, the back wall 166 in the top half 202 is positioned further rearward as compared to the back wall 166 in the bottom half 204, which is positioned further forward.

In an exemplary embodiment, the first and second openings 128, 130 of the galley compartment 102 are provided in different walls of the galley compartment 102. For example, in the illustrated embodiment, the first opening 128 is provided in the back wall 166 while the second opening 130 is provided in the top wall 162. By moving the second opening 130 to the top wall 162, as opposed to being positioned in the back wall 166, such as below the first opening 128, space is freed up in the bottom half 204 of the galley compartment 102. The back wall 166, in the bottom half 204, such as below the air supply components, may be moved inward or forward toward the galley cart 108. Moving the back wall 166 forward toward the galley cart 108 reduces the footprint of the galley monument 104 and provides additional space in the passenger area 112. For example, shifting the back wall 166 forward increases leg room of the row of passenger seats 114 behind the galley compartment 102.

In an exemplary embodiment, the back wall 166 includes a jogged section 210 that shifts portions of the back wall 166 closer to the galley cart 108 as compared to other portions. For example, the back wall 166 is non-planar with an upper section 212 above the jogged section 210 and a lower section 214 below the jogged section 210. In the illustrated embodiment, the upper section 212 is positioned the first distance 206 (e.g., further from) from the galley cart 108 and the lower section 214 is positioned the second distance 208 (e.g., closer to) from the galley cart 108.

In an exemplary embodiment, the jogged section 210 reduces the width of the corresponding portion (e.g., the bottom half 204) of the cavity 150 by a significant amount. For example, the jogged section 210 may reduce the width of the cavity 150 by at least 5%. Optionally, the jogged section 210 may reduce the width of the cavity 150 by 10% or more. The jogged section 210 may increase leg room of rows of passenger seats 114 behind the galley compartment 102. Optionally, the jogged section 210 may shift the position of the lower section 214 of the back wall 166 by at least 3 inches. The jogged section 210 may shift the lower section 214 by more than 3 inches in alternative embodiments. In aircraft 106 having multiple galley monuments 104, reducing the footprint of multiple galley monuments 104 may allow additional rows of passenger seats 114 in the aircraft 106, which may increase the revenue produced by the aircraft 106.

The jogged section 210 may be angled non-horizontal between the upper section 212 and the lower section 214 to provide a smooth transition between the upper section 212 and the lower section 214. Optionally, the jogged section 210 may be curved. The jogged section 210 may be positioned at the center line 200. Alternatively, the jogged section 210 may be positioned above the center line 200 or below the center line 200. The jogged section 210 may be positioned in close proximity to the air supply components, such as the air supply duct 132 and/or the air supply device 180. Positioning the jogged section 210 as such provides the greatest amount of gained space (shown by the dashed line) in the passenger area 112.

Optionally, the back wall 166 may be provided very near the galley cart 108, however a slight gap may be provided between the galley cart 108 and the back wall 166 to provide the space 154 for the return air to circulate from the cart return vent 190 to the air return device 182. In an exemplary embodiment, the galley cart 108 may be positioned in the galley compartment 102 such that the space 154 has a first width 216 defined between a front 218 of the galley cart 108 and the door 152, and having a second width 220 defined between a rear 222 of the galley cart 108 and the back wall 166. Optionally, the first width 216 may be approximately equal to the second width 220 such that the space 154 is provided in front of and behind the galley cart 108 to provide air circulation around the galley cart 108 to the air return device 182.

In the illustrated embodiment, the air return duct 134 is positioned above the galley cart 108. The air return duct 134 is routed along the top wall 162. The air return duct 134 and air return device 182 may be aligned along a vertical axis 230 with the galley cart 108. Having the air return duct 134 and the air return device 182 above the galley cart 108, as opposed to along the back wall 166, allows the back wall 166 to be shifted forward toward the galley cart 108 to realize gained space (shown by the dashed line) in the passenger area 112. In alternative embodiments, the air return duct 134 may be positioned below the galley cart 108, such as in the floor and the air return duct 134 may be routed appropriately to the heat exchanger 116, which may include limiting routing to areas other than the back wall 166 to allow the back wall 166 to be positioned as far forward as possible to achieve a large amount of gained space in the passenger area 112.

In an exemplary embodiment, the galley compartment 102 includes an airflow component transition zone 224, in which air supply components, such as the air supply duct 132 and air supply device 180 are located. Optionally, at least a portion of the back wall 166 is positioned vertically below the airflow component transition zone 224. For example, the jogged section 210 transitions the lower section 214 of the back wall 166 vertically below the airflow component transition zone 224. In an exemplary embodiment, an exterior environment behind the galley compartment 102, which defines a portion of the passenger area 112 as positioned vertically below the airflow component transition zone 224. As such, a portion of the passenger area 112 encroaches below the galley monument 104 which allows the volume of the passenger area 112 to encroach upon what would otherwise be part of the galley monument footprint. As such, the footprint of the passenger area 112 over laps with the footprint of the galley area 115 increases the usable space of the cabin 110.

Figure 3:
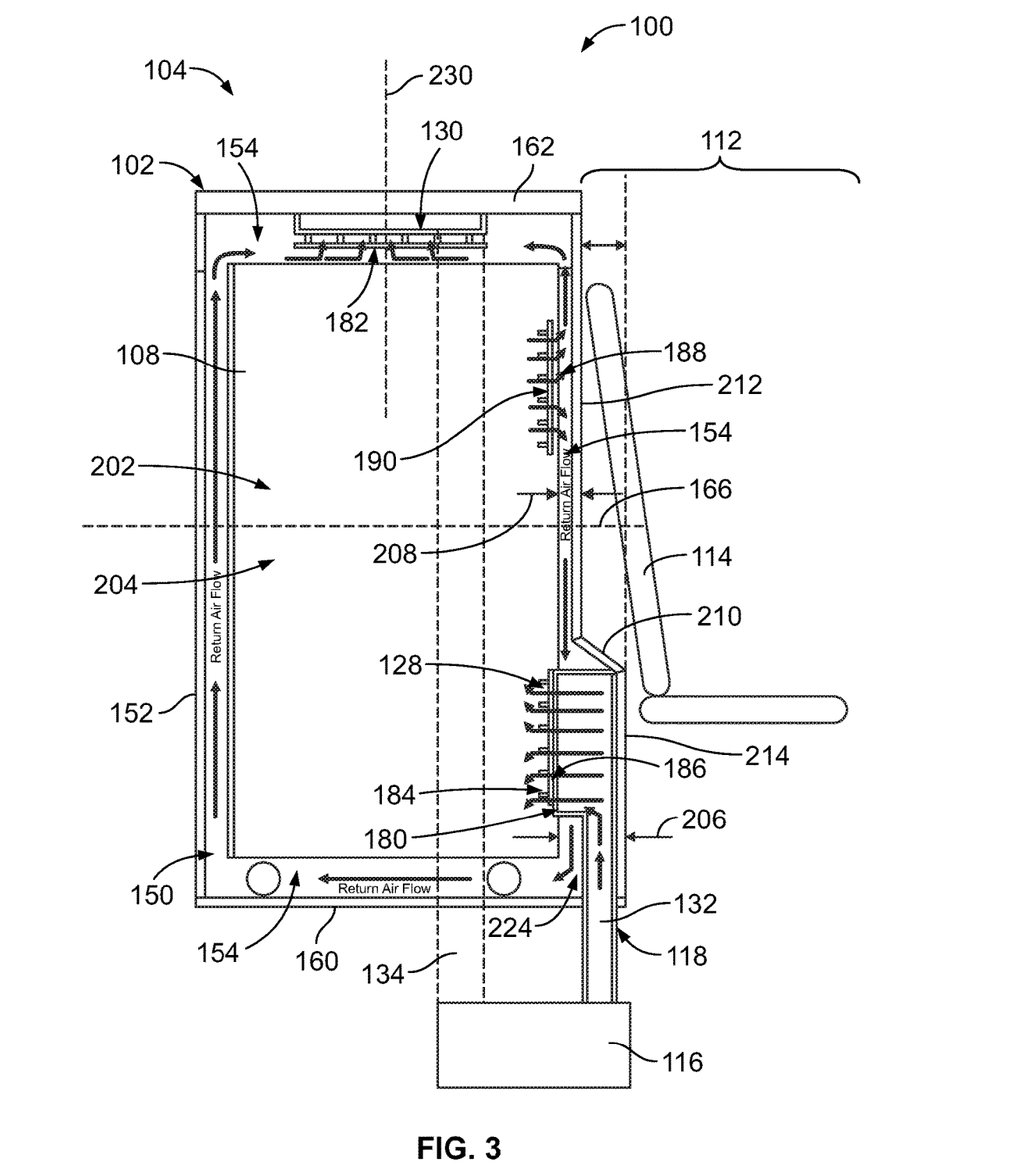
FIG. 3 is a cross-sectional view of a portion of the galley monument and galley system in accordance with an exemplary embodiment.

FIG. 3 is a cross-sectional view of a portion of the galley monument 104 and galley system 100 in accordance with an exemplary embodiment. FIG. 3 illustrates various components of the airflow supply and return system 118 in different locations than the embodiment illustrated in FIG. 2. In the illustrated embodiment, the back 126 of the galley monument 104 is forward facing with the passenger seats 114 positioned forward of the galley monument 104. Optionally, the heat exchanger 116 (shown schematically in FIG. 3) is positioned below the galley monument 104, such as below the floor.

The airflow supply and return system 118 is arranged within the galley monument 104 to direct the air into the galley compartment 102 through the first opening 128 and to circulate the air from the galley compartment 102 through the second opening 130. In the illustrated embodiment, some components of the airflow supply and return system 118, such as the air supply duct 132 and the air supply device 180, are arranged along the back wall 166 of the galley compartment 102, such as near the bottom wall 160. In an exemplary embodiment, other components of the airflow supply and return system 118, such as the air return duct 134 and the air return device 182 are not along the back wall, but rather are routed along other areas, such as along the top wall 162, to reduce a depth of at least a portion of the galley compartment 102. For example, the top half 202 of the galley compartment 102 is devoid of air ducts or other components of the airflow supply and return system 118, and thus the back wall 166 in the top half 202 is shifted inward toward the galley cart 108 to reduce the depth of the galley compartment 102 in the associated area (e.g., in the top half 202). At least a portion of the back wall 166 is shifted toward the galley cart 108 to reduce the volume of the cavity 150 of the galley compartment 102. Such reduction in volume of the galley compartment 102 equates to an increase in volume of the passenger area 112. For example, more space may be provided for passenger seats 114. For example, more seat reclining room may be provided for the passenger seats 114.

The airflow supply and return system 118 is in flow communication with the galley cart 108. For example, the air supply duct 132 is in flow communication with the first opening 128 of the galley compartment 102, such as at the air supply device 180, and is in flow communication with the first opening 186 of the galley cart 108, such as at the cart supply vent 184. The air return duct 134 is in flow communication with the second opening 130 of the galley compartment 102, such as at the air return device 182, and is in flow communication with the second opening 188 of the galley cart 108, such as through the cart return vent 190 and the space 154 about the galley cart 108. During use, flow of air through the supply and return system 118 flows through the air supply duct 132, through the air supply device 180 and into the galley cart 108. The air passes over the food or beverages in the galley cart 108, such as by an air-through-cart supply arrangement. The air from the galley cart 108 then flows through the cart return vent 190 into the space 154. The door 152 closes the cavity 150 to define the space 154 and contain the air in the space 154. The air is able to flow around the outside of the galley cart 108 within the space 154 in an air-over-cart supply arrangement to the air return device 182. The air flows through the return device 182 to the air return duct 134.

In an exemplary embodiment, the first and second openings 128, 130 of the galley compartment 102 are provided in different walls of the galley compartment 102. For example, in the illustrated embodiment, the first opening 128 is provided in the back wall 166 while the second opening 130 is provided in the top wall 162. By moving the second opening 130 to the top wall 162, as opposed to being positioned in the back wall 166, such as below the first opening 128, space is freed up in the top half 202 of the galley compartment 102. The back wall 166, in the top half 202, such as above the air supply components, may be moved inward or forward toward the galley cart 108. Moving the back wall 166 forward toward the galley cart 108 reduces the space occupied by the galley monument 104 and provides additional space in the passenger area 112.

In an exemplary embodiment, the jogged section 210 shifts portions of the back wall 166 closer to the galley cart 108 as compared to other portions. For example, the lower section 214 below the jogged section 210 is positioned the first distance 206 (e.g., further from) from the galley cart 108 and the upper section 212 is positioned the second distance 208 (e.g., closer to) from the galley cart 108. The jogged section 210 may be positioned in close proximity to the air supply components, such as immediately above the air supply duct 132 and/or the air supply device 180. Positioning the jogged section 210 as such provides the greatest amount of gained space (shown by the dashed line) in the passenger area 112. Optionally, at least a portion of the back wall 166 is positioned vertically above the airflow component transition zone 224. For example, the jogged section 210 transitions the upper section 212 of the back wall 166 vertically above the airflow component transition zone 224. In an exemplary embodiment, an exterior environment forward of the galley compartment 102, which defines a portion of the passenger area 112 as positioned vertically above the airflow component transition zone 224.

The air return duct 134 is positioned above the galley cart 108. The air return duct 134 and air return device 182 are aligned along the vertical axis 230 with the galley cart 108. The air return duct 134 is routed along the top wall 162, and may be routed downward to the heat exchanger 116 below the galley monument 104, such as by passing between two galley carts 108. In alternative embodiments, both the air return duct 134 and the air supply duct 132 may be routed upward to the heat exchanger 116 in the crown of the aircraft 106, when so positioned. Having the air return duct 134 and the air return device 182 above the galley cart 108, as opposed to along the back wall 166, allows the back wall 166 to be shifted forward toward the galley cart 108 to realize gained space in the passenger area 112. In alternative embodiments, the air return duct 134 may be positioned below the galley cart 108, such as in the floor and the air return duct 134 may be routed appropriately to the heat exchanger 116, which may include limiting routing to areas other than the back wall 166 to allow the back wall 166 to be positioned as far inward as possible to achieve a large amount of gained space in the passenger area 112.

Figure 4:
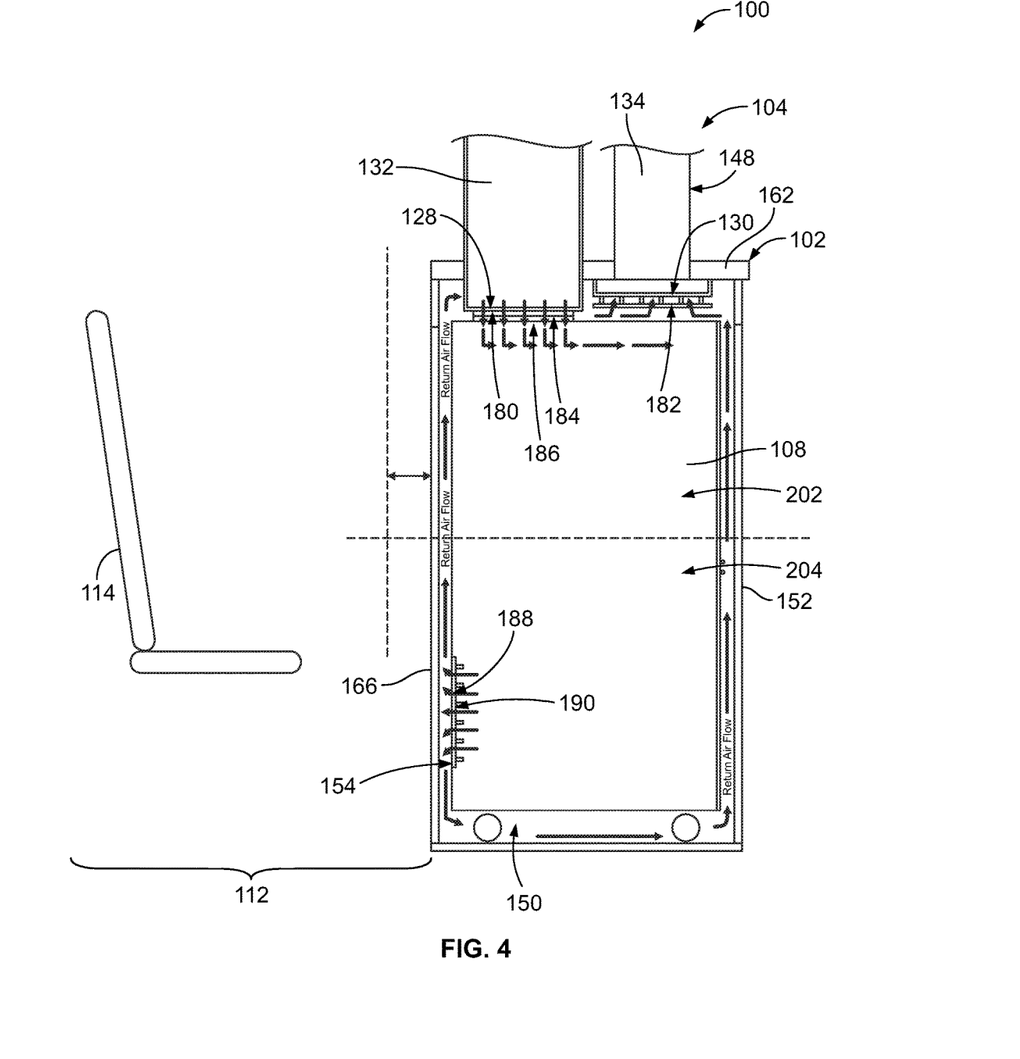
FIG. 4 is a cross-sectional view of a portion of the galley monument and galley system in accordance with an exemplary embodiment.

FIG. 4 is a cross-sectional view of a portion of the galley monument 104 and galley system 100 in accordance with an exemplary embodiment. FIG. 4 illustrates various components of the airflow supply and return system 118 in different locations than the embodiment illustrated in FIGS. 2 and 3. The airflow supply and return system 118 is arranged within the galley monument 104 to direct the air into the galley compartment 102 through the first opening 128 and to circulate the air from the galley compartment 102 through the second opening 130.

In the illustrated embodiment, none of the components of the airflow supply and return system 118 are provided along the back wall 166 of the galley compartment 102. Rather, the air supply duct 132 and the air supply device 180, as well as the air return duct 134 and the air return device 182, are provided along the top wall 162. The air supply duct 132 and the air supply device 180 as well as the air return duct 134 and air return device 182 are vertically aligned with the galley cart 108, in the illustrated embodiment, above the galley cart 108; however in alternative embodiments, the air supply duct 132 and the air supply device 180 as well as the air return duct 134 and air return device 182 may be positioned below the galley cart 108. The back wall 166 is devoid of any air ducts, to reduce a depth of at least a portion of the galley compartment 102. For example, the back wall 166 in both the top half 202 and the bottom half 204 is shifted inward toward the galley cart 108, as compared to galley monuments that provide airflow supply or return components along the back wall 166, to reduce the depth of the galley compartment 102. The back wall 166 is shifted toward the galley cart 108 to reduce the volume of the cavity 150 of the galley compartment 102. Such reduction in volume of the galley compartment 102 equates to an increase in volume of the passenger area 112. For example, more space may be provided for passenger seats 114.

The airflow supply and return system 118 is in flow communication with the galley cart 108. For example, the air supply duct 132 is in flow communication with the first opening 128 of the galley compartment 102, such as at the air supply device 180, and is in flow communication with the first opening 186 of the galley cart 108, such as at the cart supply vent 184. The air return duct 134 is in flow communication with the second opening 130 of the galley compartment 102, such as at the air return device 182, and is in flow communication with the second opening 188 of the galley cart 108, such as through the cart return vent 190 and the space 154 about the galley cart 108. During use, flow of air through the supply and return system 118 flows through the air supply duct 132, through the air supply device 180 and into the galley cart 108. The air passes over the food or beverages in the galley cart 108, such as by an air-through-cart supply arrangement. The air from the galley cart 108 then flows through the cart return vent 190 into the space 154. The door 152 closes the cavity 150 to define the space 154 and contain the air in the space 154. The air is able to flow around the outside of the galley cart 108 within the space 154 in an air-over-cart supply arrangement to the air return device 182. The air flows through the return device 182 to the air return duct 134. In alternative embodiments, the air return device 182 and the air return duct 134 may be positioned below the galley cart 108, such as in the floor and the air return duct 134 may be routed appropriately to the heat exchanger 116, which may include limiting routing to areas other than the back wall 166 to allow the back wall 166 to be positioned as far forward as possible to achieve a large amount of gained space in the passenger area 112. In alternative embodiments, the air supply device 180 and the air supply duct 132 may be positioned below the galley cart 108, such as in the floor and the air supply duct 132 may be routed appropriately to the heat exchanger 116, which may include limiting routing to areas other than the back wall 166 to allow the back wall 166 to be positioned as far forward as possible to achieve a large amount of gained space in the passenger area 112.

Figure 5:
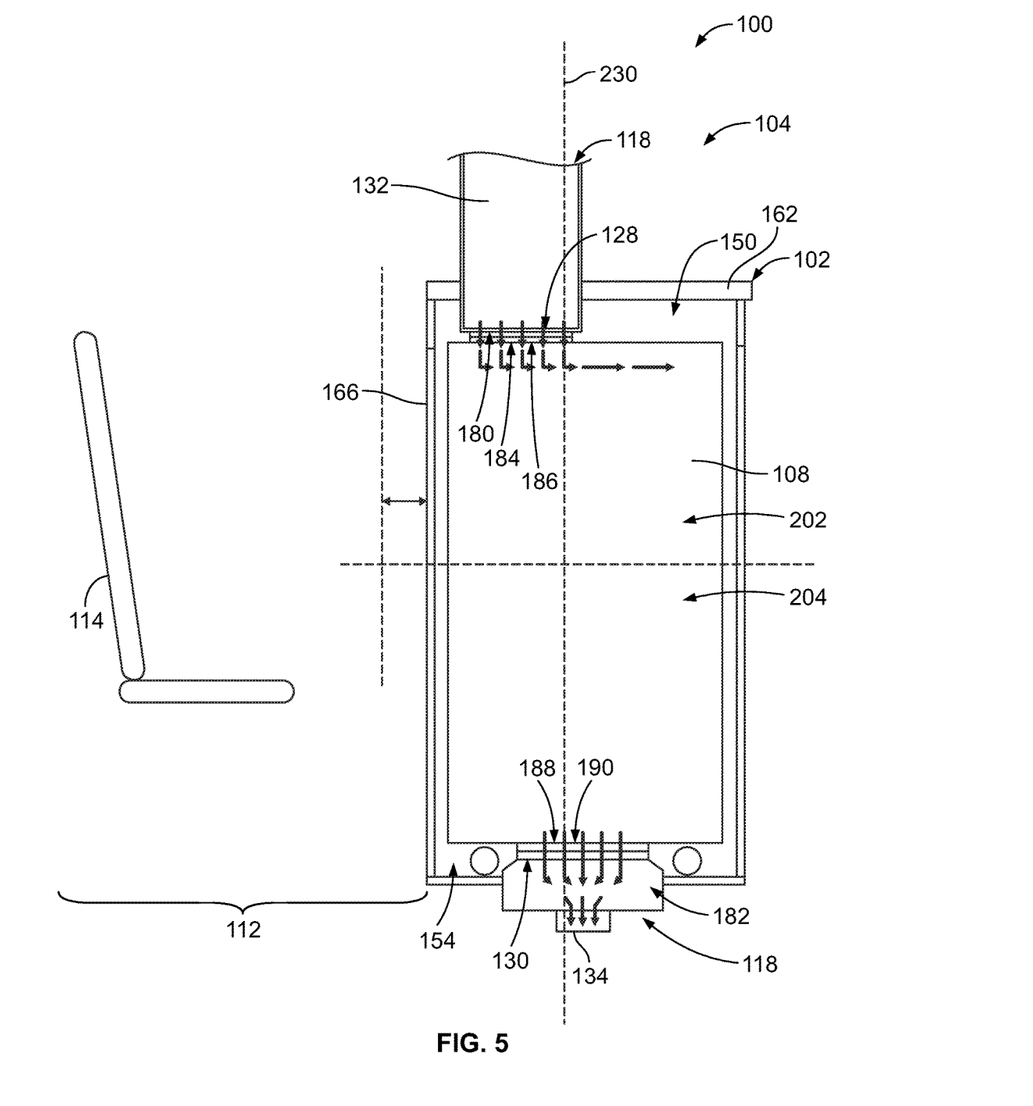
FIG. 5 is a cross-sectional view of a portion of the galley monument and galley system in accordance with an exemplary embodiment.

FIG. 5 is a cross-sectional view of a portion of the galley monument 104 and galley system 100 in accordance with an exemplary embodiment. FIG. 5 illustrates various components of the airflow supply and return system 118 in different locations than the embodiment illustrated in FIGS. 2-4. The airflow supply and return system 118 is arranged within the galley monument 104 to direct the air flow through the galley compartment 102 and galley cart 108 through the first and second openings 128, 130.

In the illustrated embodiment, none of the components of the airflow supply and return system 118 are provided along the back wall 166 of the galley compartment 102. Rather, the air supply duct 132 and the air supply device 180 are provided along the top wall 162, and the air return duct 134 and the air return device 182 are provided along the bottom wall 160. However, other arrangements are possible in alternative embodiments, including providing the air supply duct 132 and the air supply device 180 at the bottom or floor and providing the air return duct 134 and the air return device 182 in the top wall 162. The air supply duct 132 and the air supply device 180 as well as the air return duct 134 and air return device 182 are vertically aligned along the vertical axis 230 with the galley cart 108. The back wall 166 is devoid of any air ducts, to reduce a depth of at least a portion of the galley compartment 102. For example, the back wall 166 in both the top half 202 and the bottom half 204 is shifted inward toward the galley cart 108, as compared to galley monuments that provide airflow supply or return components along the back wall 166, to reduce the depth of the galley compartment 102. Optionally, the back wall 166 may abut against the back of the galley cart 108. The back wall 166 is shifted toward the galley cart 108 to reduce the volume of the cavity 150 of the galley compartment 102. Such reduction in volume of the galley compartment 102 equates to an increase in volume of the passenger area 112. For example, more space may be provided for passenger seats 114.

The airflow supply and return system 118 is in flow communication with the galley cart 108. For example, the air supply duct 132 is in flow communication with the first opening 128 of the galley compartment 102, such as at the air supply device 180, and is in flow communication with the first opening 186 of the galley cart 108, such as at the cart supply vent 184. The air return duct 134 is in flow communication with the second opening 130 of the galley compartment 102, such as at the air return device 182, and is in flow communication with the second opening 188 of the galley cart 108, such as at the cart supply vent 184. In the illustrated embodiment, the air return device 182 is a cart valve configured to directly engage and receive air flow directly from the galley cart 108, as opposed to an air grill that receives the airflow from the space 154. During use, flow of air through the supply and return system 118 flows through the air supply duct 132, through the air supply device 180 and into the galley cart 108. The air passes over the food or beverages in the galley cart 108, such as by an air-through-cart supply arrangement. The air from the galley cart 108 then flows through the cart return vent 190 into the air return device 182 and then into the air return duct 134. Such an arrangement provides an air-through-cart arrangement. In such an arrangement, because the air does not flow in the space 154, it may be possible to provide the galley compartment 102 without the door(s). However, in other embodiments, the air return device 182 may be an air grill that receives air flow from the space around the galley cart 108, which may require the door(s).

In other alternative embodiments, the air-through-cart arrangement may be provided with both the air supply device 180 and the air return device 182 (e.g., both cart valves) either at the top or at the bottom. In such embodiments, a vertical divider panel may be provided in the center of the galley cart 108 to prevent a short circuit airflow from the supply, across the top inside portion of the galley cart 108, to the return. The vertical divider panel may stop short at the bottom or may include a vent at the bottom to allow the air flow from the supply side of the galley cart 108 to the return side of the galley cart 108, thus ensuring airflow through the entire galley cart 108.

A galley system is provided for an aircraft that supplies cooling air to a compartment of a galley monument for cooling galley carts. The supply and/or return ducts and supply and/or return devices for the airflow are arranged to reduce a size or footprint of the galley monument. Additional space is provided in the passenger compartment by shifting the walls of the galley compartment inward (e.g., closer to the galley cart), such as for adding additional room for passenger seating. Optionally, at least one of the supply components and/or the return components are moved from the back wall and placed in other areas of the galley compartment, such as along the top or along the bottom. For example, some embodiments provide only the air supply components along the back wall, moving the return components to the top or the bottom of the galley compartment. Space that would have otherwise been needed for the return components is no longer required, allowing the back wall to shift forward, such as to allow more leg room for the row of passenger seats. For example, some embodiments provide only the return supply components along the back wall, moving the supply components to the top or the bottom of the galley compartment. Space that would have otherwise been needed for the supply components is no longer required, allowing the back wall to shift forward, such as to allow more leg room for the row of passenger seats. For example, some embodiments provide neither the air supply components nor the air return components along the back wall, rather having both the supply and return components along the top; both the supply and return components along the bottom; the supply components along the top and the return components along the bottom; or the supply components along the bottom and the return components along the top. Space that would have otherwise been needed for the supply and return components is no longer required, allowing the back wall to shift forward, such as to allow more leg room for the row of passenger seats.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments without departing from the scope thereof. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the various embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. A galley system comprising:
a galley compartment defining a cavity, the galley compartment comprising a door that allows access to the cavity;
an airflow supply and return system in flow communication with the galley compartment, the airflow supply and return system having a plurality of ducts for supplying cooled airflow and returning warmed airflow through the airflow supply and return system; and
a galley cart positionable in the cavity of the galley compartment, the galley cart having a first opening and a second opening configured to allow airflow into and out of the galley cart by an air-through-cart cooling arrangement;
wherein the galley cart is positionable in the cavity such that a space is defined about the galley cart, the galley cart being positioned in the cavity such that the first opening is aligned with and directly coupled to and in direct flow communication with a first duct of the plurality of ducts of the airflow supply and return system and such that the second opening is offset from a second duct of the plurality of ducts and in direct flow communication with the space about the galley cart, the space providing flow communication between the second opening of the galley cart and the offset second duct of the plurality of ducts such that air flows indirectly between the second opening of the galley cart and the second duct substantially throughout the space outside of the galley cart.

2. The galley system of claim 1, further comprising an airflow device between the first opening and the first duct to direct the airflow between the first duct and the first opening.

3. The galley system of claim 1, wherein the connection between the first opening and the first duct is sealed with respect to the space and the connection between the second opening and the second duct is unsealed allowing airflow through the space between the second opening and the second duct.

4. The galley system of claim 1, wherein the first duct is a supply duct configured to be coupled in flow communication with the galley cart by an air-through-cart arrangement.

5. The galley system of claim 1, wherein the first duct is a return duct configured to be coupled in flow communication with the galley cart through the first opening by an air-through-cart arrangement.

6. The galley system of claim 1, wherein the second duct is a return duct configured to be coupled in flow communication with the space to cool an exterior of the galley cart by an air-over-cart supply arrangement using the air passed through the galley cart and channeled into the space through the second opening.

7. The galley system of claim 1, wherein the second duct is a supply duct configured to be coupled in flow communication with the galley cart by an air-over-cart arrangement.

8. The galley system of claim 1, wherein the galley compartment comprises a plurality of walls, the first and second ducts being provided in different walls.

9. The galley system of claim 1, wherein the galley compartment comprises a back wall, a top wall, bottom wall, and a front wall with the door, at least one of the first duct or the second duct is defined in at least one of the top wall or the bottom wall and not in the back wall.

10. The galley system of claim 9, wherein both the first duct and the second duct are defined in at least one of the top wall or the bottom wall and not in the back wall.

11. The galley system of claim 1, wherein the galley compartment comprises a back wall opposite the door, the galley compartment including a top half and a bottom half, the first and second ducts being routed through the back wall at either the top half or the bottom half, the other of the top half or bottom half being devoid of any of the plurality of ducts.

12. The galley system of claim 1, wherein the galley compartment comprises a back wall opposite the door having an interior facing the cavity, the galley compartment including a top half and a bottom half, the exterior of the back wall along the top half being positioned a first distance from the galley cart, the exterior of the back wall along the bottom half being positioned a second distance from the galley cart different than the first distance.

13. The galley system of claim 1, wherein the galley compartment comprises a back wall opposite the door, the space having a first width defined between a front of the galley cart and the door, the space having a second width defined between a rear of the galley cart and the back wall, the first width being approximately equal to the second width.

14. The galley system of claim 1, wherein at least one of the first opening or the second opening in the galley compartment is aligned along a vertical axis with the galley cart.

15. The galley system of claim 1, further comprising an air valve between the first duct and the first opening of the galley cart, the air valve being positioned either above or below the galley cart.

16. The galley system of claim 1, wherein the first duct, the second duct and the galley cart are aligned along a vertical axis with the galley cart positioned between the first and second ducts.

17. The galley system of claim 1, wherein the galley compartment comprises a back wall opposite the door having an interior facing the cavity and an exterior facing a passenger compartment, the back wall having a jogged section such that the exterior of the back wall is non-planar.

18. The galley system of claim 17, wherein the jogged section increases leg room of a row of seats behind the galley compartment.

19. The galley system of claim 17, wherein the jogged section increases seat reclining room of a row of seats in front of the galley compartment.

20. A galley monument for use with a galley cart having a first opening and a second opening, the galley monument comprising:
- a galley compartment having a back wall, a top wall, a bottom wall, and a front wall, the front wall having a doorway defined therethrough, the doorway configured to allow the galley cart to be positioned in the galley compartment;
- a door coupled to the front wall to close the doorway, wherein the back wall, the top wall, the bottom wall and the door define a cavity configured to receive the galley cart;
- an air supply duct configured to be coupled in flow communication with the first opening of the galley cart; and
- an air return duct configured to be coupled in flow communication with the second opening of the galley cart;
- wherein at least one of the air supply duct or the air return duct is defined in the back wall below and proximate to the top wall of the galley compartment, and
- wherein one of the air supply duct or the air return duct is located proximate to at least one of the first and second openings of the galley cart for direct flow communication therebetween and the other of the air supply duct or the air return duct is located remote and spaced apart from the first and second openings of the galley cart for indirect flow communication therebetween.

21. The galley monument of claim 20, wherein the other of the air supply duct or the air return duct is defined in the back wall below and proximate to the other of the air supply duct or the air return duct more proximate to the top wall than the bottom wall.

22. The galley monument of claim 21, wherein the back wall includes a jogged section being jogged inward such that the back wall in the jogged section is vertically aligned below the at least one of the air supply duct or the air return duct defined in the back wall.

23. The galley monument of claim 20, wherein the other of the air supply duct or the air return duct is defined in the top wall or the bottom wall and is not defined in the back wall.

24. A galley monument for use with a galley cart having a first opening and a second opening, the galley monument comprising:
- a galley compartment having a back wall, a top wall, a bottom wall, and a front wall, the front wall having a doorway defined therethrough, the doorway configured to allow the galley cart to be positioned in the galley compartment;

a door coupled to the front wall to close the doorway, wherein the back wall, the top wall, the bottom wall and the door define a cavity configured to receive the galley cart;

an air supply duct configured to be coupled in flow communication with the first opening of the galley cart; and an air return duct configured to be coupled in flow communication with the second opening of the galley cart;

wherein at least one of the air supply duct or the air return duct is defined in the back wall above and proximate to the bottom wall of the galley compartment, and wherein one of the air supply duct or the air return duct is located proximate to at least one of the first and second openings of the galley cart for direct flow communication therebetween and the other of the air supply duct or the air return duct is located remote and spaced apart from the first and second openings of the galley cart for indirect flow communication therebetween.

25. The galley monument of claim 24, wherein the other of the air supply duct or the air return duct is defined in the back wall above and proximate to the other of the air supply duct or the air return duct more proximate to the bottom wall than the top wall.

26. The galley monument of claim 25, wherein the back wall includes a jogged section being jogged inward such that the back wall in the jogged section is vertically aligned above the at least one of the air supply duct or the air return duct defined in the back wall.

27. The galley monument of claim 24, wherein the other of the air supply duct or the air return duct is defined in the top wall or the bottom wall and is not defined in the back wall.

28. A galley monument for use with a galley cart having a first opening and a second opening, the galley monument comprising:

a galley compartment having a back wall, a top wall, a bottom wall, and a front wall, the front wall having a doorway defined therethrough, the doorway configured to allow the galley cart to be positioned in the galley compartment;

a door coupled to the front wall to close the doorway, wherein the back wall, the top wall, the bottom wall and the door define a cavity configured to receive the galley cart;

an air supply duct configured to be coupled in flow communication with the first opening of the galley cart; and an air return duct configured to be coupled in flow communication with the second opening of the galley cart;

wherein the air supply duct and the air return duct are defined in at least one of the top wall and the bottom wall such that neither the air supply duct nor the air return duct are in the back wall, and wherein one of the air supply duct or the air return duct is located proximate to at least one of the first and second openings of the galley cart for direct flow communication therebetween and the other of the air supply duct or the air return duct is located remote and spaced apart from the first and second openings of the galley cart for indirect flow communication therebetween.

29. The galley monument of claim 28, wherein both the air supply duct and the air return duct are vertically aligned with the galley cart and do not extend rearward of the galley cart in the galley monument.

* * * * *